United States Patent
Petrik et al.

(10) Patent No.: US 10,773,966 B2
(45) Date of Patent: Sep. 15, 2020

(54) PROCESS FOR PRODUCTION OF HIGH SILICA CONTENT ZEOLITE FROM FLY ASH

(71) Applicant: University of the Western Cape, Bellville (ZA)

(72) Inventors: Leslie Felicia Petrik, Cape Town (ZA); Roland Missengue-Na-Moutoula, Bellville (ZA); Alechine Emmanuel Ameh, Bellville (ZA); Tapiwa Hlatywayo, Bellville (ZA)

(73) Assignee: University of the Western Cape, Bellville (ZA)

( * ) Notice: Subject to any disclaimer, the term of this patent is extended or adjusted under 35 U.S.C. 154(b) by 79 days.

(21) Appl. No.: 16/312,553

(22) PCT Filed: Jun. 22, 2017

(86) PCT No.: PCT/IB2017/053730
§ 371 (c)(1),
(2) Date: Dec. 21, 2018

(87) PCT Pub. No.: WO2017/221192
PCT Pub. Date: Dec. 28, 2017

(65) Prior Publication Data
US 2019/0225499 A1    Jul. 25, 2019

(30) Foreign Application Priority Data
Jun. 23, 2016 (GB) .................................. 1610955.5

(51) Int. Cl.
*C01B 39/40* (2006.01)
*C01B 39/48* (2006.01)
(Continued)

(52) U.S. Cl.
CPC ............... *C01B 39/40* (2013.01); *B01J 20/18* (2013.01); *B01J 29/40* (2013.01); *B01J 29/70* (2013.01);
(Continued)

(58) Field of Classification Search
CPC ....... C01B 39/36; C01B 39/365; C01B 39/38; C01B 39/40; C01B 39/48; B01J 20/18;
(Continued)

(56) References Cited

U.S. PATENT DOCUMENTS 6,027,708 A    2/2000    Sadhana et al.

FOREIGN PATENT DOCUMENTS

GB    2339775    2/2000

OTHER PUBLICATIONS

Wajima et al.,"Effect of a Chelating Agent on the Synthesis of Zeolitic Materials From Waste Sandstone Cake Using Alkali Fusion", Acta Separatoria Acta, (2007) pp. 76-87 (Year: 2007).*
(Continued)

*Primary Examiner* — David M Brunsman
(74) *Attorney, Agent, or Firm* — Meunier Carlin & Curfman LLC

(57) ABSTRACT

The present invention provides for a process for the production of an aluminosilicate zeolite from fly ash, and in particular but not exclusively, to a process for producing a high silica content zeolite from fly ash without the addition of an external silica source, such as sodium silicate.

16 Claims, 11 Drawing Sheets

(51) Int. Cl.
*C01B 37/02* (2006.01)
*B01J 29/70* (2006.01)
*C01B 39/38* (2006.01)
*B01J 37/16* (2006.01)
*C01B 39/36* (2006.01)
*B01J 20/18* (2006.01)
*B01J 29/40* (2006.01)

(52) U.S. Cl.
CPC ........... *B01J 29/7007* (2013.01); *B01J 37/16* (2013.01); *C01B 37/02* (2013.01); *C01B 39/36* (2013.01); *C01B 39/365* (2013.01); *C01B 39/38* (2013.01); *C01B 39/48* (2013.01)

(58) Field of Classification Search
CPC ........ B01J 29/40; B01J 29/70; B01J 29/7007; B01J 37/16
See application file for complete search history.

(56) References Cited

OTHER PUBLICATIONS

Udhoji et al, "Improvement in optical brightness of fly ash based zeolite—A for use a detergent builder", Journal of Scientific and Industrial Research, (May 2005) pp. 367-371 (Year: 2005).*
Missengue et al, "Transformation of South African coalfly ash into ZSM-5zeolite and its application as an MTO catalyst", Comptes Rendus Chimie, (2017) pp. 78-86 (Year: 2017).*
Zhang et al, "Extraction of metals from municipal solid wasteincinerator fly ash by hydrothermal process", Journal of Hazardous Materials B136 (2006) 663-670 (Year: 2006).*
International Search Report and Written Opinion dated Sep. 18, 2017, from International Application No. PCT/IB2017/053730, 9 pages.
Kalyankar, A.N. et al. "Low Frequency Dielectric properties of Fly ash based zeolite ZSM-5", International Journal of Basic and Applied Research, vol. 1, Jan. 1, 2011, pp. 59-63.
Chareonpanich, M. et al. "Bench-scale synthesis of zeolite A from subbituminous coal ashes with high crystalline silica content", Journal of Cleaner Production, vol. 19, No. 1, Jan. 1, 2011, pp. 58-63.

* cited by examiner

PROCESS FOR PRODUCTION OF HIGH SILICA CONTENT ZEOLITE FROM FLY ASH

INTRODUCTION

This application is a 371 filing of PCT/IB2017/053730, filed Jun. 22, 2017.

This invention relates to a process for the production of high silica content zeolites from fly ash, and in particular but not exclusively, to a process for producing ZSM-5 zeolite from fly ash.

BACKGROUND

Several methods have been proposed for the synthesis of various types of zeolites from alternative materials including fly ash, rice husk ash, metakaolin, oil shale fly ash, and other Si—Al containing feedstocks.

Many of the proposed methods for the production of zeolites from fly ash, in particular high silica content zeolites, include the fortification of the reaction mixture with an external source of silica to alter the Si:Al molar ratio to a level that will produce the desired final product.

The use of fly ash in the synthesis of high silica content zeolites such as ZSM-5 has not been as successful as anticipated due to the addition of a silica source to increase the Si:Al molar ratio. In addition, non-reactive phases such as mullite and quartz appeared in the final product.

Kalyankar et al., (2011) synthesised zeolite ZSM-5 from Indian fly ash with a $SiO_2/A_2O_3$ ratio of 3 and silica sol was added to get a $SiO_2/A_2O_3$ ratio of 37.2 in the hydrothermal gel.

Reanvattana, (2005) synthesised high purity zeolite ZSM-5 from a mixture of fused fly ash filtrate and added silica extracted from rice husk ash.

Chareonpanich et al., (2004) synthesised zeolite ZSM-5 from Thailand fly ash with $SiO_2/Al_2O_3$ ratio of 1.6. $SiO_2$ extracted from rice husk ash was added to adjust the Si:Al molar ratio to 20, 40, 60, 80, 100 or 200. The addition of an important amount of silica source in the hydrothermal gel and the presence of unreacted fly ash in the final product after synthesis did not promote the synthesis of high silica content zeolites as a way to valorise fly ash, and has to date limited the commercialisation and applications of fly ash-based zeolite ZSM-5.

Therefore, there remains a need to develop a commercially attractive method for the synthesis of aluminosilicate zeolite materials, in particular high silica content zeolites such as ZSM-5, from fly ash as an alternative to the use of relatively high cost pure starting materials.

SUMMARY OF THE INVENTION

According to a first aspect to the present invention there is provided a process for producing a high silica content zeolite from fly ash, the method comprising the steps of:
  fusing a fly ash containing starting material in the presence of a basic medium to form a fused reaction mixture, which mixture is brought into contact with a mineral acid, then separated to produce a first fly ash material;
  treating the first fly ash material with a selective chelating agent to produce an impurity depleted zeolite feedstock;
  treating the zeolite feedstock with a mineralising agent;
  optionally further treating the zeolite feedstock with a structure directing agent to form an aluminosilicate containing gel; and
  crystallising the aluminosilicate containing gel in a hydrothermal crystallisation step to form the aluminosilicate zeolite.

In one embodiment, the high silica content zeolite is a zeolite having a Si:Al molar ratio of greater than 10.

In one embodiment, the high silica content zeolite is selected from the group consisting of pentasil-type zeolites, MCM-type zeolites, zeolite BEA, and SBA-15.

In another embodiment, the high silica content zeolite is selected from the group consisting of ZSM-5, ZSM-8, and ZSM-11.

In a preferred embodiment, the high silica content zeolite is ZSM-5.

In a preferred embodiment, the high silica content zeolite is zeolite beta.

In a preferred embodiment, wherein the high silica content zeolite is MCM-41 or MCM-48.

Preferably, the selective chelating agent is selected from the group consisting of oxalic acid, Ethylenediaminetetraacetic acid (EDTA), diethylenetriaminepentaacetic acid (DTPA), N-(hydroxyethyl)-ethylenediaminetriacetic acid (HEDTA), nitrilotriacetic acid (NTA), citric acid, and ascorbic acid.

Most preferably, the selective chelating agent is oxalic acid or citric acid.

Preferably, the structure directing agent is selected from the group consisting of Tetrapropylammonium halide, Tetraethylammonium halide, Tripropylamine, Dipropylamine, Propylamine, 1,6-diaminohexane, 1,6-hexanediol, 1,5-diaminopentane, Ethanolamine, Propanolamine, Pentaerythritol, Methylquinuclidine, Morpholine, Ethylenediamine, Diethylenetetraamine, Triethylenetriamine, Dipropylenetriamine, Dihexamethylenetriamine, Di-n-butylamine, Ethanol, Ethanol and ammonia, and Glycerol.

More preferably, structure directing agent is selected from the group consisting of tetrapropylammonium bromide, 1,6-hexanediamine, and 1-propylamine.

Most preferably, the structure directing agent is 1,6-hexanediamine.

In one embodiment, the basic medium is selected from the group consisting of sodium hydroxide, and potassium hydroxide.

In one embodiment, the mineralising agent is selected from the group consisting of a source of hydroxide ions, and fluoride ions.

In one embodiment, the mineral acid is selected from the group consisting of sulphuric acid, phosphoric acid, hydrochloric acid, and nitric acid.

In a preferred embodiment, the mineral acid is sulphuric acid.

BRIEF DESCRIPTION OF THE DRAWINGS

The invention will now be described in more detail with reference to the following non-limiting embodiments and figures in which.

DETAILED DESCRIPTION OF A PREFERRED EMBODIMENT

Figure 1:
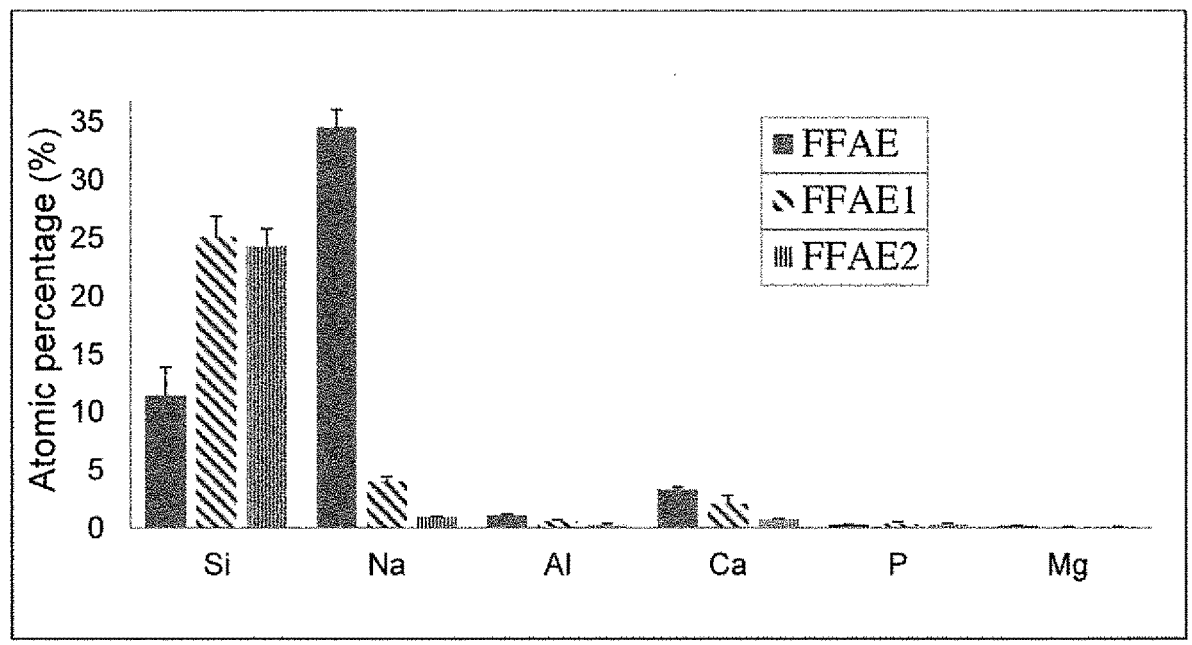
FIG. 1 shows a graphical representation of the atomic mass percentage of major elements in various fly ash extracts.
Figure 2:
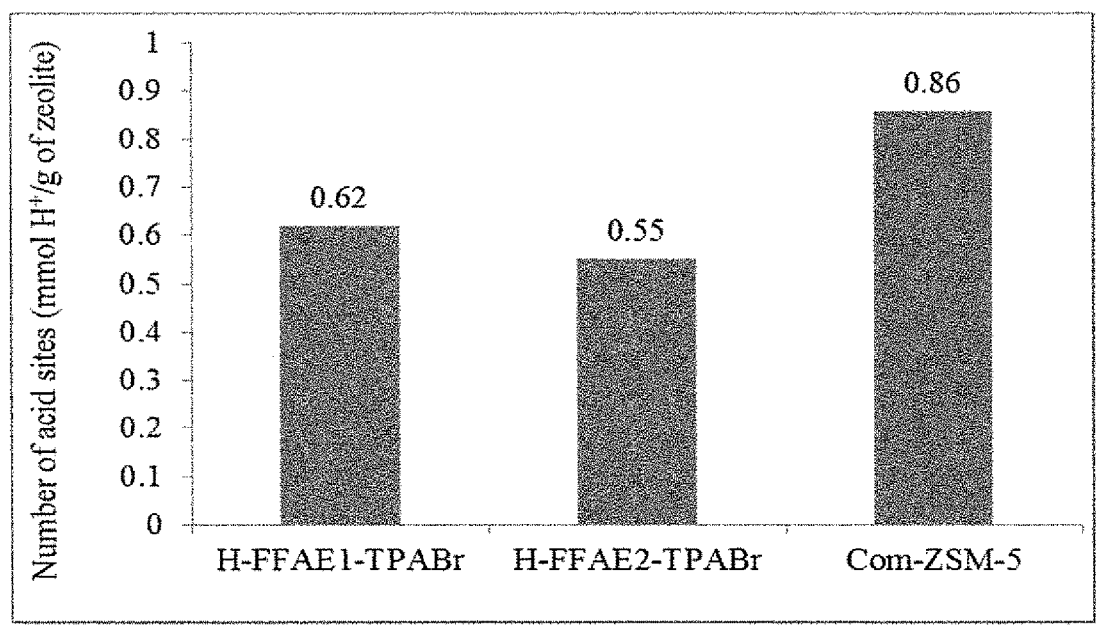
FIG. 2 shows a graphical representation of the number of Brønsted acid sites (mmol H+/g of zeolite) of the H-FFAE-OX1-TPABr, H-FFAE-OX2-TPABr and the commercial H-ZSM-5 (Com-ZSM-5)

The present invention will now be described more fully hereinafter with reference to the accompanying figures, in which some of the non-limiting embodiments of the invention are shown.

The invention as described hereinafter should not be construed to be limited to the specific embodiments disclosed, with slight modifications and other embodiments intended to be included within the scope of the invention.

Although specific terms are employed herein, they are used in a generic and descriptive sense only and not for purposes of limitation.

As used herein, throughout this specification and in the claims which follow, the singular forms "a", "an" and "the" include the plural form, unless the context clearly indicates otherwise.

The terminology and phraseology used herein is for the purpose of description and should not be regarded as limiting. The use of the terms "comprising", "containing", "having", "including", and variations thereof used herein, are meant to encompass the items listed thereafter, and equivalents thereof as well as additional items.

As used herein, the term "high content silica zeolite" should be understood to mean a zeolite material having a Si:Al molar ratio of at least greater than 10, preferably greater than 20, preferably greater than 35, preferably greater than 50, preferable greater than 75, or preferably greater than 100.

As used herein, the term "selective chelating agent" should be understood to mean an agent, material and/or solution which is used to treat a fly ash extracted material to thereby reduce the content of certain elements may be considered impurities in the process of producing zeolites, such as sodium and calcium, as well as the aluminium content, thereby to potentially alter the Si:Al molar ratio in the treated material.

The present invention provides for a process for the production of an aluminosilicate zeolite from fly ash, and in particular but not exclusively, to a process for producing a high silica content zeolite from fly ash without the addition of an external silica source, such as sodium silicate.

Several methods have been proposed for the synthesis of various types of zeolites from alternative materials including fly ash, rice husk ash, metakaolin, oil shale fly ash, and other Si—Al containing feedstocks. Many of the proposed methods for the production of zeolites from fly ash include the fortification of the reaction mixture with an external source of silica to alter the Si:Al molar ratio to a level that will produce the desired final product. Unfortunately, the step of fortifying the reaction mixture imports an additional cost, rendering these methods unsuitable for large scale commercial production.

The inventors have now surprisingly found that the Si:Al reaction mixture can be treated with a selective chelating agent, thereby removing unwanted impurities such as sodium and calcium and altering the Si:Al molar ratio, to such an extent that the desired zeolite may successfully be produced without the need to introduce an external silica source. This method is particularly useful for producing a high silica content zeolite having a high Si:Al molar ratio, for example a ratio greater than 10:1.

Furthermore, without thereby wishing to be bound by the confines of any particular theory, it is believed that the chelating agent preferentially binds the sodium ions present in the reaction mixture (in addition to other impurities and Al), which may impede the crystallization of the Si—Al containing gel. It was determined by a chemical analysis of a fused fly ash extract material (FFAE) that sodium is the most abundant element at a concentration of about 35%. A first treatment of the FFAE with a saturated oxalic solution removed most of the sodium, as well as a certain amount of aluminium and calcium. Furthermore, it was shown that further treatments of the FFAE material lead to an increase in the Si:Al molar ratio due to the binding of the chelating agent with aluminium. Therefore, the process of the invention could be adapted to prepare a precursor or feedstock with a particular Si:Al molar ratio for a range of high silica content zeolites, and zeolite-like materials, from coal fly ash depending on the desired final product.

The selective chelating agent may be selected based on the elemental profile of the particular fly ash extract material forming the starting material for the zeolite synthesis. The chelating agent may be selected to selectively bind the most abundant non-silica and non-aluminium impurities in the mixture, whilst also altering the Si:Al molar ratio to a preferred level, thereby to produce an impurity depleted zeolite feedstock. The method may also employ more than one chelation treatment of the reaction mixture to deal with more than one problematic element in the mixture, or more than one chelation treatments of the reaction mixture to firstly deal with problematic impurities, and thereafter to address the Si:Al molar ratio. It is envisaged that the selective chelating agents of these steps may be the same, or different, based on the elements which it is required to bind to and extract. Alternatively, the molar ratio of the chelating agent may be selected such that the binding of the undesirable ions in the reaction mixture may be achieved in a single chelation treatment.

It is envisaged that the selective chelating agent may be selected from oxalic acid, Ethylenediaminetetraacetic acid (EDTA), diethylenetriaminepentaacetic acid (DTPA), N-(hydroxyethyl)-ethylenediaminetriacetic acid (HEDTA), nitrilotriacetic acid (NTA), citric acid, and ascorbic acid. The chelating agent may also be any other ligand known to selectively bind the undesirable element of interest in the particular fly ash extract.

For example, oxalic acid can be used as the selective chelating agent to selectively bind to sodium and aluminium ions present in the reaction mixture, based on the availability of these ions in this mixture and its affinity for this particular chelating agent. In the case of oxalic acid the oxalate anion will bind with $Na^+$ ions to form sodium oxalate, while two aluminium atoms will bind to three oxalate ligands to form an aluminium-oxalate complex.

The fused fly ash extract, which has been treated with one or more selective chelating agents, is then treated with a mineralising agent to break the existing structure thereby to make the aluminium, silicon, and oxygen atoms available for the crystal framework formation. The mineralising agent, and resultant reaction, can be selected from those known in the art.

The method of the invention further optionally employs a structure directing agent. For example, where the desired zeolite to be produced is ZSM-5 a structure directing agent may be selected from tetrapropylammonium bromide, 1,6-hexanediamine, and 1-propylamine.

It will also be appreciated by those persons skilled in that other zeolite types may be synthesized through a judicious selection of a combination of the appropriate structure directing agent and the appropriate selective chelating agent. For example, it is envisaged that the method may be used to produce zeolite P without the use of a structure directing agent.

The invention will now be described more fully hereinafter with reference to the following non-limiting experimental embodiments.

Methods and Materials

The coal fly ash used was collected from Arnot coal-fired power plant (Mpumalanga, South Africa). Sulphuric acid (95-99%) and 1-propylamine were purchased from Merck. Tetrapropylammonium bromide (TPABr), methanol (99.8%), chloroform-d (99 atom % D), chloroform (299.9%), trifluoroacetic anhydride (≥99%) ammonium nitrate (≥98%) and oxalic acid (≥99%) were obtained from Sigma-Aldrich. Sodium hydroxide (NaOH, pearls, 97%) and 1,6-hexanediamine were purchased from Kimix Chemical and Laboratory Supplies. A commercial ZSM-5 zeolite (ZSM-$5_c$) was purchased from Zeolyst.

Experiment 1a: Oxalic Acid Treatment of Fused Fly Ash Extract

Fly ash (50 g) was mixed with 60 g of NaOH. The mixture was fused at 550° C. for 1.5 hours. The fused fly ash was mixed with 500 mL of de-ionised water for 2 hours and filtered. Concentrated sulphuric acid (95-99%) was added dropwise to the filtrate while stirring to precipitate silica. A white fused fly ash extract material (FFAE) was formed at the pH of 10. The FFAE material was filtered, washed with de-ionised water and dried overnight at 70° C.

FFAE (5 g) was mixed with 50 mL of saturated oxalic acid solution at 80° C. for 6 hours under reflux conditions. The oxalic acid treated material, referred to as FFAE-OX1, was dried overnight at 70° C. Furthermore, FFAE-OX1 was treated with a fresh saturated oxalic acid solution (50 mL), referred to as FFAE-OX2, which was dried overnight at 70° C.

The chemical compositions of FFAE, FFAE-OX1 and FFAE-OX2 were determined by ICP after their total digestion using the method suggested by Missengue et. al., 2015. FFAE, FFAE-OX1 and FFAE-OX2 were then used as as impurity depleted zeolite feedstocks in the synthesis of zeolite ZSM-5 without the addition of any external silicon or aluminium sources.

Experiment 1b: Citric Acid Treatment of Fused Fly Ash Extract

FFAE (5 g) was mixed with 50 mL of saturated citric acid solution at 80° C. for 6 hours under reflux conditions. The citric acid treated material, referred to as FFAE-C was filtered and dried overnight at 70° C.

The elemental composition of FFAE-C was determined by XRF. The elemental composition of FFAE-C showed a sum total of Si, Na and Al oxides of 64.7% and the weight percent follows a decreasing trend of $SiO_2 > Na_2O > Al_2O_3$. The FFAE-C contains a low amount of $K_2O$ and $Fe_2O_3$ to be less than 0.05% and other oxides of metals constitute less than 0.03% of the total elemental oxide. The Si:Al molar ratio of FFAE-C preparation was about 73.

Experiment 2: Total Digestion of Solid Samples

The fused fly ash extracts (FFAE, FFAE-OX1 and FFAE-OX2) were digested in order to determine their chemical composition using ICP.

A sample of FFAE, FFAE-OX1 or FFAE-OX2 (0.25 g) was mixed with 2 mL of concentrated hydrofluoric acid (HF) and 5 mL of aqua regia ($HNO_3/HCl$, 1:3) in a digestion vessel that was placed in a pre-heated oven at 250° C. for 2 hours. Thereafter, the mixture was allowed to cool and the excess HF in the digestate was neutralised by adding 25 mL of saturated boric acid ($H_3BO_3$) solution. The digestate was filtered through a 45-μm pore filter paper; and the effluent diluted to 50 mL with de-ionised water. The chemical composition of each sample was determined using an ICP-OES analyser. The atomic percentage in 0.25 g of each sample was then calculated.

FIG. 1 shows the atomic mass percentage of major elements in FFAE, FFAE-OX1 and FFAE-OX2, respectively.

Sodium (34.5±1.5%) was the most abundant element in FFAE followed by silicon (11.4±2.5%), calcium (3.3±0.2%) and aluminium (1.1±0.1%), with a Si:Al molar ratio of about 10. Silicon (25.1±1.8%) was the most abundant element in FFAE-OX1, followed by sodium (4.0±0.4%), calcium (2.1±0.7%) and aluminium (0.6±0.1%), with a Si:Al molar ratio of about 41. It is therefore clear that the first treatment of FFAE with a saturated oxalic solution resulted in an extract with most of the sodium, as well as a certain amount of aluminium and calcium, removed.

The atomic mass percentage of silicon in FFAE-OX2 increased to 24.3±1.5%. The mass percentage of sodium, calcium and aluminium in FFAE-OX2 is 1.0±0.0%, 0.8±0.0% and 0.3±0.1% respectively, with a Si:Al ratio in FFAE-OX2 of about 79. Moreover, the Si:Al molar ratios of FFAE, FFAE-OX1, FFAE-OX2 and FFAE-C showed that these fused fly ash extracts could be used to synthesise high silica content zeolites such as ZSM-5. This process can therefore be employed to prepare suitable precursors for a range of high silica content aluminosilicate zeolites and zeolite-like materials from coal fly ash.

Experiment 3: Synthesis of Zeolite ZSM-5 from Fused Fly Ash Extracts

FFAE, FFAE-OX1 and FFAE-OX2 were mixed with NaOH in de-ionised water. Thereafter, tetrapropylammonium bromide (TPABr), 1,6-hexanediamine (HDA) or 1-propylamine (PA) was added to obtain the molar values presented in Table 1. The obtained gel underwent aging at room temperature for 30 minutes and hydrothermal crystallisation at 160° C. for 72 hours in a digestion vessel.

The synthesized zeolite Na-ZSM-5 samples were filtered, washed with de-ionised water and dried in an oven at 70° C. The dried zeolite Na-ZSM-5 samples were calcined in a furnace at 550° C. for 3 hours with a ramping temperature of 15° C./min. Na-ZSM-5 samples were transformed to their H-form by ion-exchange with 0.5 M ammonium nitrate ($NH_4NO_3$). Zeolite Na-ZSM-5 was treated with 0.5 M $NH_4NO_3$ solution at a ratio zeolite/$NH_4NO_3$ of 1:10 at 80° C. for 1 hour. The mixture was filtered and the treatment was repeated 4 times with a fresh aliquot of $NH_4NO_3$ each time. The solid product obtained after treatment with $NH_4NO_3$ was dried overnight at 70° C. and calcined at 550° C. for 3 hours with a ramping rate of 15° C./min.

The titration of O-D sites was performed by back-exchanging deuterium (D) present on the surface of H-ZSM-5 sample with $H_2O$ vapour saturated $N_2$ stream for 1 hour. Deuterated HxODy was collected in a cold trap at −78° C., weighed and mixed with 0.6 mL of trifluoroacetic anhydride. A $CHCl_3/CDCl_3$ reference (10:1 in weight) was prepared to determine the Brønsted acid site density using Bruker Ultra-Shield 300 MHz/54 mm spectrometer.

Figure 3:
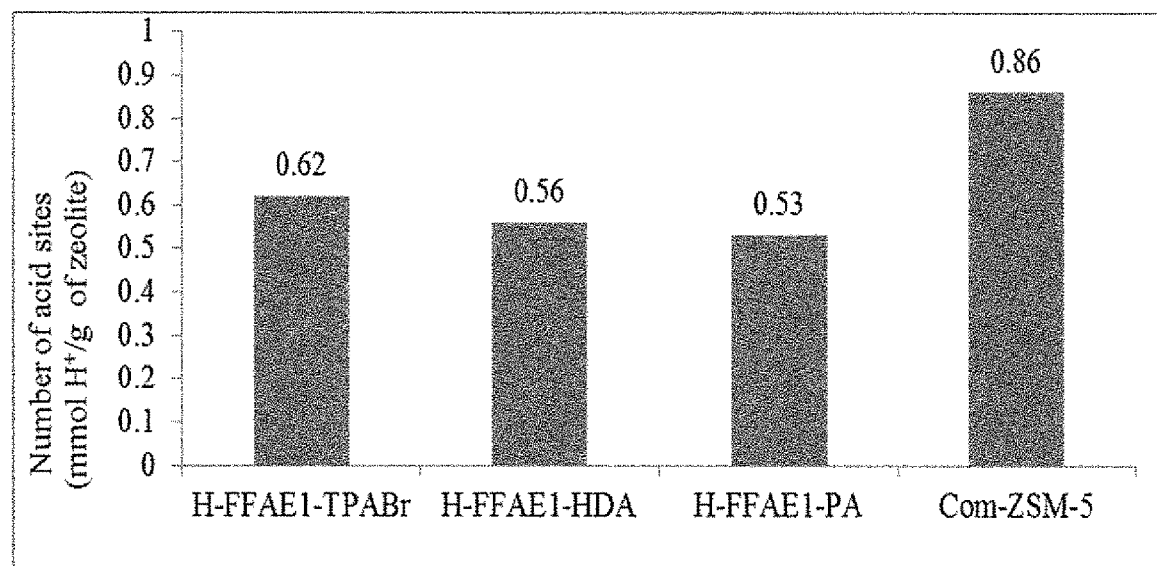
FIG. 3 shows a graphical representation of the number of Brønsted acid sites (mmol H+/g of zeolite) of H-FFAE-OX1-TPABr, H-FFAE-OX1-HDA, H-FFAE-OX1-PA and the commercial H-ZSM-5 (Com-ZSM-5)
Figure 4:
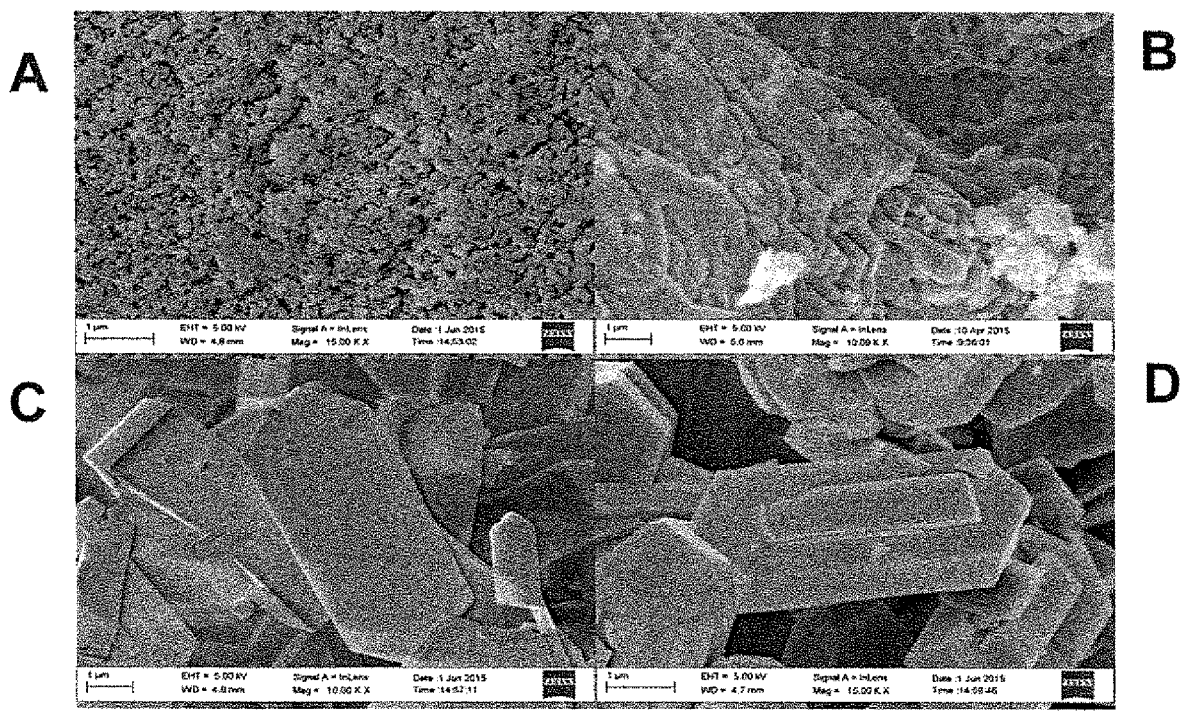
FIG. 4 shows comparative SEM images indicating the effect of the Si:Al ratio.

The results of the Brønsted acid site density experiments for H-FFAE-OX1-TPABr, H-FFAE-OX2-TPABr, H-FFAE-OX1-HDA, and H-FFAE-OX1-PA are summarised in FIGS. 3 and 4.

Experiment 5: Methanol-to-Olefins (MTO) Catalytic Reaction

The zeolite catalyst (H-FFAE-OX1-TPABr, H-FFAE-OX2-TPABr, H-FFAE-OX1-HDA, H-FFAE-OX1-PA), 60 mg, was placed in a fixed bed quartz reactor and heated at 450° C. (heating ramp 15° C./min). After desorption of physisorbed water for 1 hour, the reactor was connected to a stripper (kept at 0° C.) containing methanol. Methanol was fed to the reactor by a $N_2$ flow (20 mL/min), resulting in a WHSV of 1.12 h−1. Gas product samples (1 mL) were collected regularly during 24 h and analysed using a Hewlett Packard 5890 Gas Chromatograph (GC) equipped with a PONA column and a FID. The results of these experiments are summarised in Tables 2 and 3 below.

TABLE 1

Synthesis of zeolite ZSM-5 from fused fly ash extracts.

| | Variable parameters (g) | | | | | | |
|---|---|---|---|---|---|---|---|
| Code name | FFAE | FFAE-OX1 | FFAE-OX2 | TPABr | HDA | PA | Molar regime |
| FFAE-TPABr | 2 | — | — | 1 | — | — | Si(10), Al(1), Na(49), $H_2O$(3412), TPABr(4) |
| FFAE-OX1-TPABr | — | 2 | — | 1 | — | — | Si(41), Al(1), Na(31), $H_2O$(6313), TPABr(7) |
| FFAE-OX2-TPABr | — | — | 2 | 1 | — | — | Si(79), Al(1), Na(49), $H_2O$(12636), TPABr(14) |
| FFAAE1-HDA | — | 2 | — | — | 1 | — | Si(41), Al(1), Na(31), $H_2O$(6313), HDA(20) |
| FFAE-OX1-PA | — | 2 | — | — | — | 1 | Si(41), Al(1), Na(31), $H_2O$(6313), PA(38) |

Experiment 4: Brønsted Acid Site Titration of the Fly Ash-Based Zeolite H-ZSM-6 Samples Using H/D Exchange Isotope Techniques The acidity of fly ash-based zeolite H-ZSM-5 samples was determined according to the method described by Louis et al., (2004). Fly ash-based zeolite H-ZSM-5 sample (200 mg) was activated under $N_2$ flow (60 mL/min) at a heating rate of 15° C./min and held at 450° C. for 1 hour to desorb water. The temperature was lowered to 200° C., to allow $D_2O$ vapour to pass through the H-ZSM-5 sample for 1 hour under $N_2$ flow. Dry $N_2$ flow was then applied to sweep away the excess $D_2O$ for a further 1 hour.

TABLE 2

Properties of H-FFAE-OX1-TPABr, H-FFAE-OX2-TPABr and the commercial H-ZSM-5 (Com-ZSM-5), and their MTO conversion and selectivity.

| | | H-FFAE1-TPABr | H-FFAE2-TPABr | Com-ZSM-5 |
|---|---|---|---|---|
| Brønsted acid sites (mmol $H^+$/g) | | 0.62 | 0.55 | 0.86 |
| Crystal size (μm) | Length | 6.52 | 4.65 | 1.46 |
| | Width | 2.56 | 1.67 | 1.11 |
| Relative XRD crystallinity (%) | | 94 | 95 | 100 |

TABLE 2-continued

Properties of H-FFAE-OX1-TPABr, H-FFAE-OX2-TPABr and the commercial H-ZSM-5 (Com-ZSM-5), and their MTO conversion and selectivity.

|  |  |  | H-FFAE1-TPABr | H-FFAE2-TPABr | Com-ZSM-5 |
|---|---|---|---|---|---|
| BET surface area (m$^2$/g) |  |  | 494.4 | 457.5 | 480.2 |
| MTO reaction | 1 h | X(%) | 99 | 97 | 100 |
|  |  | C$_3$/C$_2$ | 4.9 | 2.5 | 1.3 |
|  | 5 h | X(%) | 99 | 99 | 100 |
|  |  | C$_3$/C$_2$ | 5.2 | 8.7 | 1.6 |
|  | 24 h | X(%) | 2 | 2 | 100 |
|  |  | C$_3$/C$_2$ | 0.16 | 0.5 | 1.8 |

X(%) = conversion,
C$_3$ = selectivity toward propylene and
C$_2$ = selectivity toward ethylene.

TABLE 3

Properties of H-FFAE-OX1-TPABr, H-FFAE-OX1-HDA, H-FFAE-OX1-PA and a commercial H-ZSM-5, and their MTO conversion and selectivity.

|  |  |  | H-FFAE-OX1-TPABr | H-FFAE-OX1-HDA | H-FFAE-OX1-PA | Com-ZSM-5 |
|---|---|---|---|---|---|---|
| Brønsted acid sites (mmol H$^+$/g) |  |  | 0.62 | 0.56 | 0.53 | 0.86 |
| Crystal size (µm) | Length |  | 6.52 | 3.34 | 3.14 | 1.46 |
|  | Width |  | 2.56 | 1.10 | 1.02 | 1.11 |
| Relative XRD crystallinity (%) |  |  | 94 | 86 | 85 | 100 |
| BET surface area (m$^2$/g) |  |  | 494.4 | 387.5 | 378.9 | 480.2 |
| MTO reaction | 1 h | X (%) | 99 | 98 | 97 | 100 |
|  |  | C$_3$/C$_2$ | 4.9 | 4.1 | 7.0 | 1.3 |
|  | 5 h | X (%) | 99 | 97 | 92 | 100 |
|  |  | C$_3$/C$_2$ | 5.2 | 4.5 | 7.1 | 1.6 |
|  | 24 h | X (%) | 2 | 44 | 4 | 100 |
|  |  | C$_3$/C$_2$ | 0.2 | 4.3 | 2.3 | 1.8 |

X (%) = conversion,
C$_3$ = selectivity toward propylene and
C$_2$ = selectivity toward ethylene.

Experiment 6: Characterisation of the Synthesised Fly Ash-Based Zeolites H-ZSM-5

Only FFAE-OX1 or FFAE-OX2 gave a solid precipitate after hydrothermal synthesis. No crystals were formed when FFAE was used as zeolite ZSM-5 precursor, even if the Si:Al molar ratio of about 10 was within the range of the synthesis of zeolite ZSM-5.

Without thereby wishing to be bound by any particular theory, it is believed that the high sodium content in FFAE prevented the crystallisation of zeolite ZSM-5. Therefore, only the characterisation of FFA1-TPABr, FFAE-OX2-TPABr, FFAE-OX1-HDA and FFAE-OX1-PA is discussed below.

Experiment 6.1: Influence of Si:Al Molar Ratio on the Morphology of Fly Ash-Based Zeolite H-ZSM-5 Samples (FFAE-OX1-TPABr and FFAE-OX2-TPABr)

The morphological study was carried out in order to investigate the effect Si:Al molar ratio on ZSM-5 crystal size and shape in FFAE-OX1-TPABr and FFAE-OX2-TPABr samples. FIG. 4 showed the SEM images of FFAE-OX1 (A), FFAE-OX2 (B), FFAE-OX1-TPABr (C) and FFAE-OX2-TPABr (D).

As can be seen from FIG. 4, the amorphous form of FFAE-OX1 or FFAE-OX2 was transformed into characteristic crystals of zeolite ZSM-5, which can be described as lath-shaped crystals or coffin-shaped crystals. It can also be seen that the size of ZSM-5 crystals decreased with the increase in Si:Al molar ratio for FFAE-OX1 and FFAE-OX2. However, it is difficult to relate the decrease in ZSM-5 crystal size to the increase in Si:Al molar ratio alone, as other chemical parameters such as the number of moles of sodium, TPABr or water also varied from the hydrothermal gel of FFAE-OX1-TPABr to that of FFAE-OX2-TPABr. Furthermore, prior studies have shown that the ZSM-5 particle size increases when the Si:Al molar ratio in the hydrothermal gel increases. Therefore, as is the case with crystal shape, the source and purity of silicon and aluminium precursors could affect the ZSM-5 crystal growth.

Experiment 6.2: Influence of the Structure Directing Agent on Morphology of Fly Ash-Based Zeolite H-ZSM-5 Samples (FFAE-OX1-TPABr, FFAE-OX1-HDA and FFAE-OX1-PA)

Figure 5:
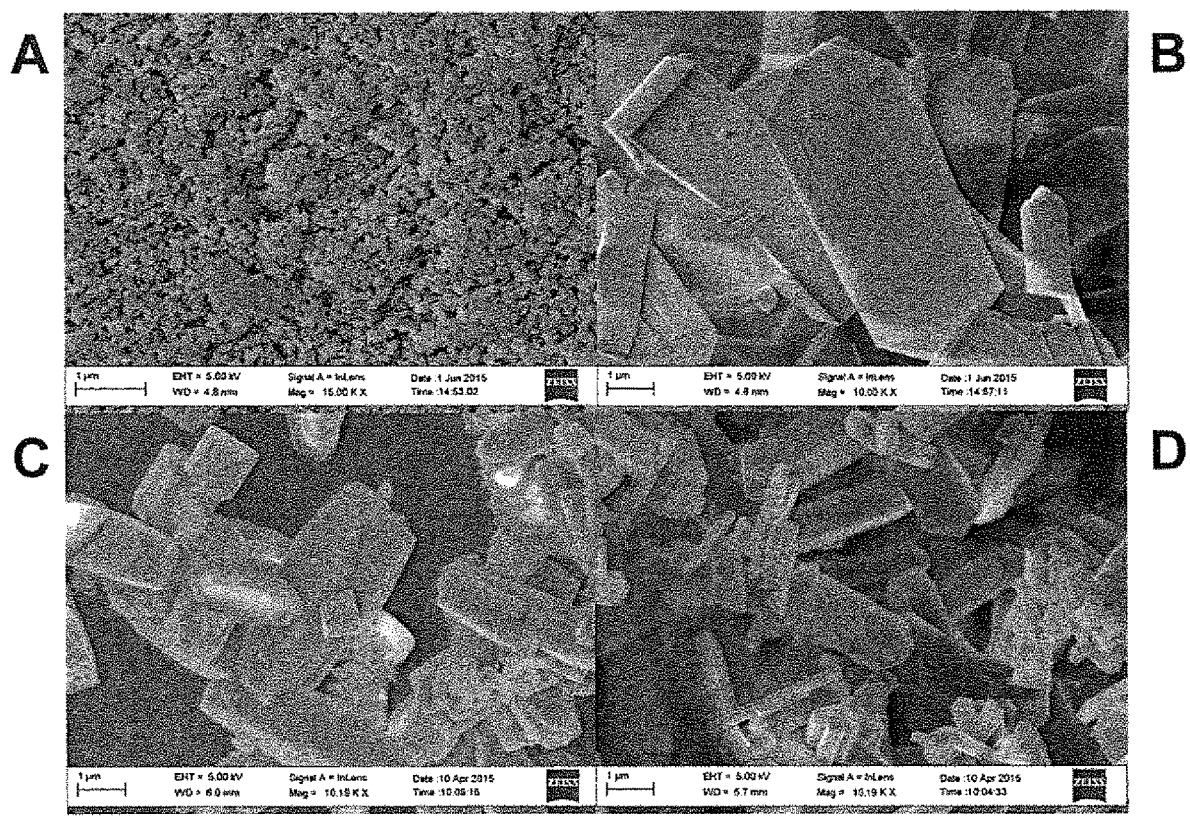
FIG. 5 shows comparative SEM images indicating the effect of various structure directing agents.

The influence of the structure directing agent (TPABr, HDA and PA) on the morphology of zeolite ZSM-5 synthesised from FFAE-OX1 is shown in FIG. 5.

FIG. 5 shows the transformation of the amorphous fused fly ash extract FFAE-OX1 (A) to the characteristic lath-shaped particles of zeolite ZSM-5 FFAE-OX1-TPABr (B), FFAE-OX1-HAD (C) and FFAE-OX1-PA(D). However, the ZSM-5 crystal shape slightly differed from one structure directing agent to another.

It could be observed that FFAE-OX1-TPABr had bigger crystals (length=6.52±0.20 µm, width=2.56±0.53 µm) than that of FFAE-OX1-HDA (length=3.34±0.72 µm, width=1.10±0.15 µm) or FFAE-OX1-PA (length=3.14±0.37 µm, width=1.02±0.16 µm). It has therefore been shown that ZSM-5 crystals obtained through hydrothermal synthesis using fly ash extracts could be tailored by varying their chemical composition via several treatments with a selective chelating agent or agents, and/or by varying the structure directing agent.

Experiment 6.3: Influence of Si:Al Molar Ratio on the Structural Analysis of Zeolite ZSM-5 (FFAE-OX1-TPABr and FFAE-OX2-TPABr)

The influence of Si:Al molar ratio on the structure of fly ash-based zeolites H-ZSM-5 was considered by analysing the FTIR spectra of FFAE-OX1, FFAE-OX2, FFAE-OX1-TPABr, FFAE-OX2-TPABr and a commercial ZSM-5 (ZSM-5).

Figure 6:
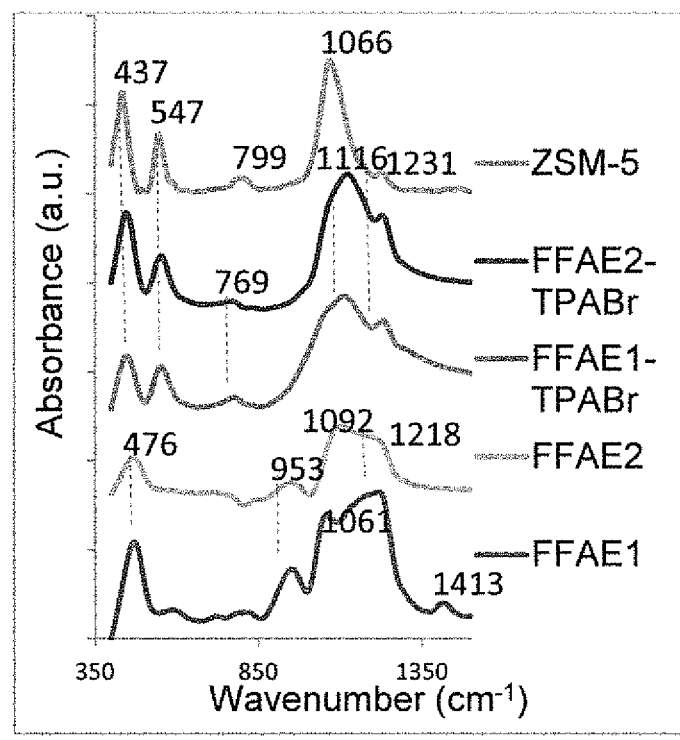
FIG. 6 shows comparative FTIR spectra of various fly ash extracts indicating the effect of the Si:Al ratio.

As can be seen from FIG. 6, the spectra of fused fly ash extracts FFAE-OX1 and FFAE-OX2 had a band at 476 cm$^{-1}$ that may be assigned to the bending vibration of Si—O—Si bond. A band at 953 cm$^{-1}$ may be attributed to the Si—O stretching vibration of silanol group. A broad band between 1061 and 1218 cm$^{-1}$ may correspond to the asymmetric vibration of Si—O—Si. The FFAE-OX1 spectrum had an extra band at 1413 cm$^{-1}$ that may correspond to the bending vibration of the trapped water molecules in silica matrix. The FFAE-OX1-TPABr and FFAE-OX2-TPABr spectra presented a band at 437 cm$^{-1}$ that may be assigned to a T-O bend (T=Si or Al). A band at 547 cm$^{-1}$ could correspond to a double ring.

It was noteworthy that the double ring band appeared only after synthesising FFAE-OX1-TPABr and FFAE-OX2-TPABr from FFAE-OX1 and FFAE-OX2 respectively. This is an indication of the synthesis of zeolite ZSM-5 from fused fly ash extracts (FFAE-OX1 and FFAE-OX2) without any additional source of silica.

The FTIR spectra of FFAE-OX1-TPABr and FFAE-OX2-TPABr also presented bands at 769, 1116 and 1231 $cm^{-1}$ that corresponded to external symmetric stretch, internal and external asymmetric stretch respectively. Although, the spectra of FFAE-OX1-TPABr and FFAE-OX2-TPABr were similar to that of a commercial ZSM-5 (ZSM-5), band shifts from 769 $cm^{-1}$ in FFAE-OX1-TPABr and FFAE-OX2-TPABr to 799 $cm^{-1}$ in commercial ZSM-5 (ZSM-5), and from 1116 $cm^{-1}$ in FFAE-OX1-TPABr and FFAE-OX2-TPABr to 1066 $cm^{-1}$ in commercial ZSM-5 (ZSM-5) was noticed. According to Shirazi et al., (2008) and Ali et al., (2003), a shift of the internal asymmetric stretch band towards higher wavenumbers was due to an increase in Si:Al molar ratio.

Experiment 6.4: Influence of the Structure Directing Agent on the Structural Analysis of Zeolite ZSM-5 (FFAE-OX1-TPABr, FFAE-OX1-HDA and FFAE-OX1-PA)

Figure 7:
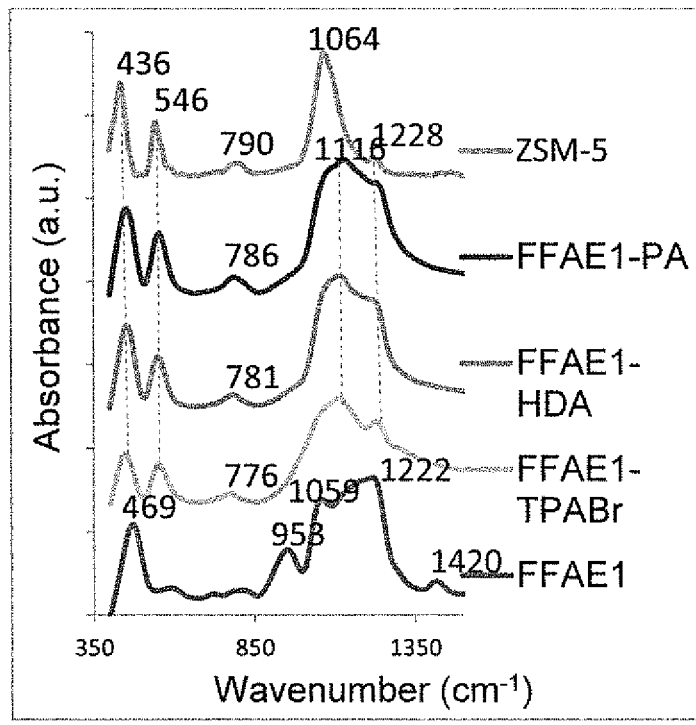
FIG. 7 shows comparative FTIR spectra of various fly ash extracts indicating the effect of various structure directing agents.

FIG. 7 shows FTIR spectra of FFAE-OX1, FFAE-OX1-TPABr, FFAE-OX1-HDA, FFAE-OX1-PA and a commercial ZSM-5 (ZSM-5).

FFAE-OX1 was used as feedstock in synthesis of zeolite ZSM-5 without an additional source of silica, with TPABr, HDA and PA as structure directing agents. The appearance of bands at 546, 776, 781, 786, 1116 and 1228 $cm^{-1}$ in FFAE-OX1-TPABr, FFAE-OX1-HDA and FFAE-OX1-PA spectra is an indication of the synthesis of zeolite ZSM-5 from FFAE-OX1. Furthermore, the shift of the internal asymmetric stretch band from 1064 $cm^{-1}$ in a commercial ZSM-5 (ZSM-5) spectrum to 1116 $cm^{-1}$ in FFAE-OX1-TPABr, FFAE-OX1-HDA and FFAE-OX1-PA is evidence of a higher Si:Al molar ratio in FFAE-OX1-TPABr, FFAE-OX1-HDA and FFAE-OX1-PA compared to the commercial ZSM-5 (ZSM-5).

Experiment 7.1: Influence of Si:Al Molar Ratio on the ZSM-5 Phase Purity

Figure 8:
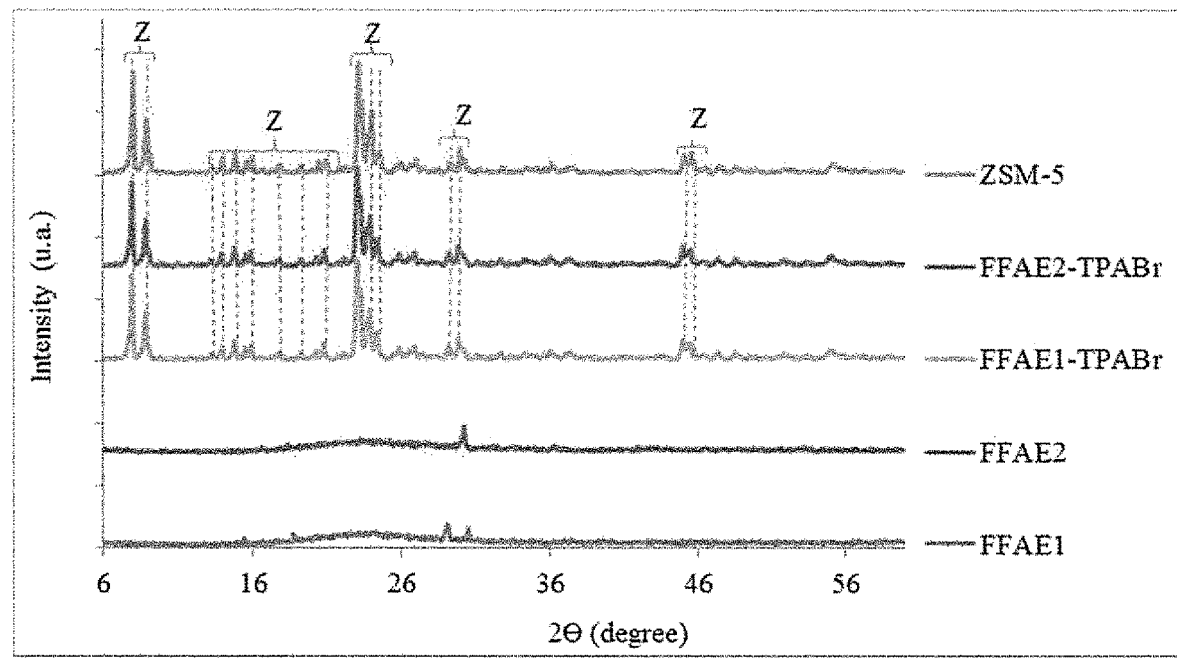
FIG. 8 shows comparative XRD patterns of fly ash extracts and fly ash based ZSM-5.

The XRD patterns of the Si and Al precursors (FFAE-OX1 and FFAE-OX2) and those of the synthesised fly ash based zeolite ZSM-5 (FFA1-TPABr and FFAE-OX2-TPABr) and a commercial ZSM-5 (ZSM-5) is compared in FIG. 8.

From FIG. 8 it can be seen that the Si and Al precursors (FFAE-OX1 and FFAE-OX2) were mainly amorphous, as is characterised by the presence of a hump between 18 and 33° 2κ. It can also be observed from the XRD patterns in FIG. 6 that FFAE-OX1-TPABr and FFAE-OX1-TPABr were only composed of ZSM-5 phase, and were identical to the XRD pattern of a commercial zeolite ZSM-5 (ZSM-5). Importantly, FFAE-OX1-TPABr and FFAE-OX1-TPABr were synthesised without addition of an external source of silica.

Figure 9:
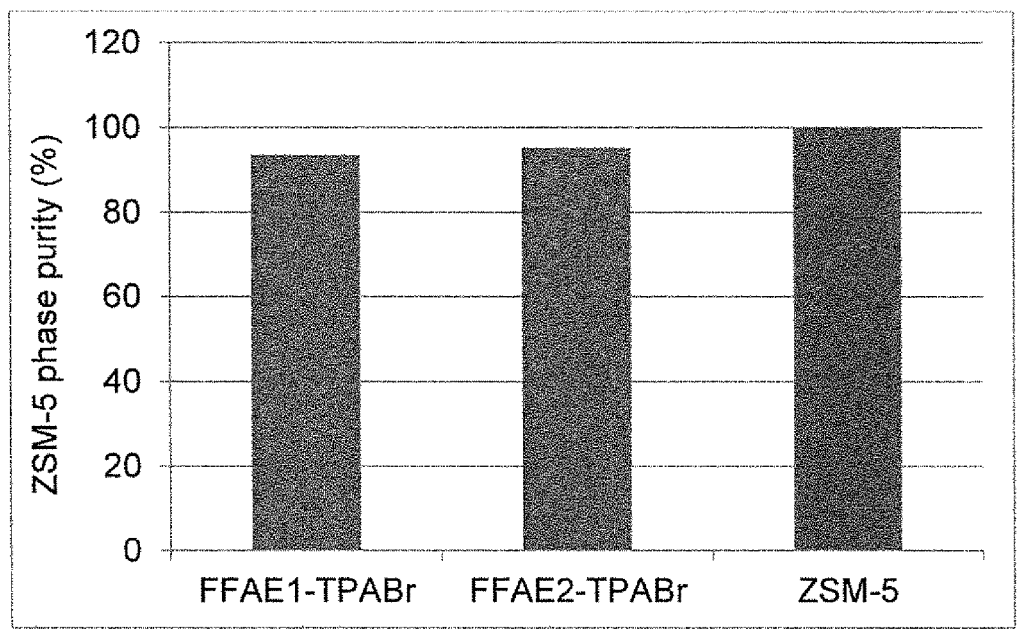
FIG. 9 shows a graphical comparison of ZSM-5 phase purity for various fly ash based preparations based on TPABr.

FIG. 9 shows a graphical presentation of the ZSM-5 phase purity of FFAE-OX1-TPABr and FFAE-OX2-TPABr against a commercial reference ZSM-5 (ZSM-5). The ZSM-5 phase purity was determined according to the formulation suggested by Nicolaides et al., (1999), (Eq. 4.1). The ZSM-5 phase purity of FFAE-OX1-TPABr and FFAE-OX2-TPABr was 94% and 95% compared to a commercial zeolite ZSM-5. A second treatment of the extract FFAE-OX1 with a saturated oxalic acid solution led to a slight increase in the ZSM-5 phase purity of the synthesised zeolites (FFAE-OX2).

Experiment 7.2: Influence of the Structure Directing Agent on the ZSM-5 Phase Purity The effect of the structure directing agent on mineralogy of zeolites synthesised from FFAE-OX1 was investigated by using TPABr, HDA, and PA as the structure directing agents.

Figure 10:
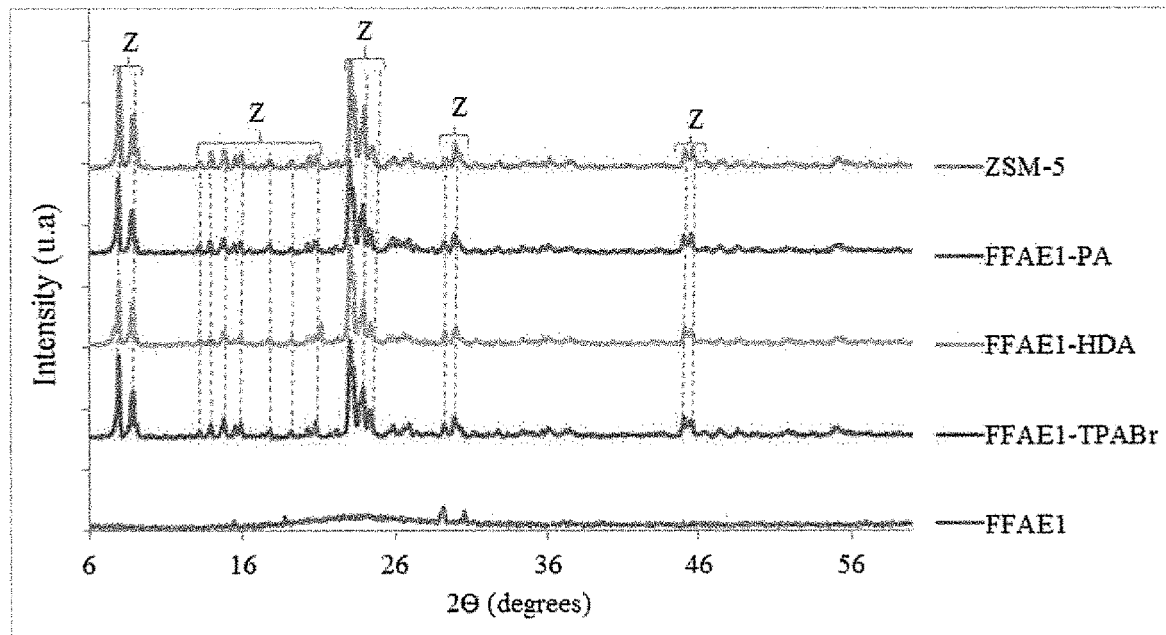
FIG. 10 shows comparative XRD patterns of fly ash extracts and fly ash based ZSM-5 indicating the effect of various structure directing agents.

FIG. 10 shows that high purity zeolite ZSM-5 (FFAE-OX1-TPABr, FFAE-OX1-HDA or FFAE-OX1-PA) was synthesised from an amorphous fused fly ash extract (FFAE-OX1) using the three abovementioned structure directing agents, as is confirmed by a comparison of the XRD patterns with the XRD pattern of commercial zeolite ZSM-5 (ZSM-5).

Figure 11:
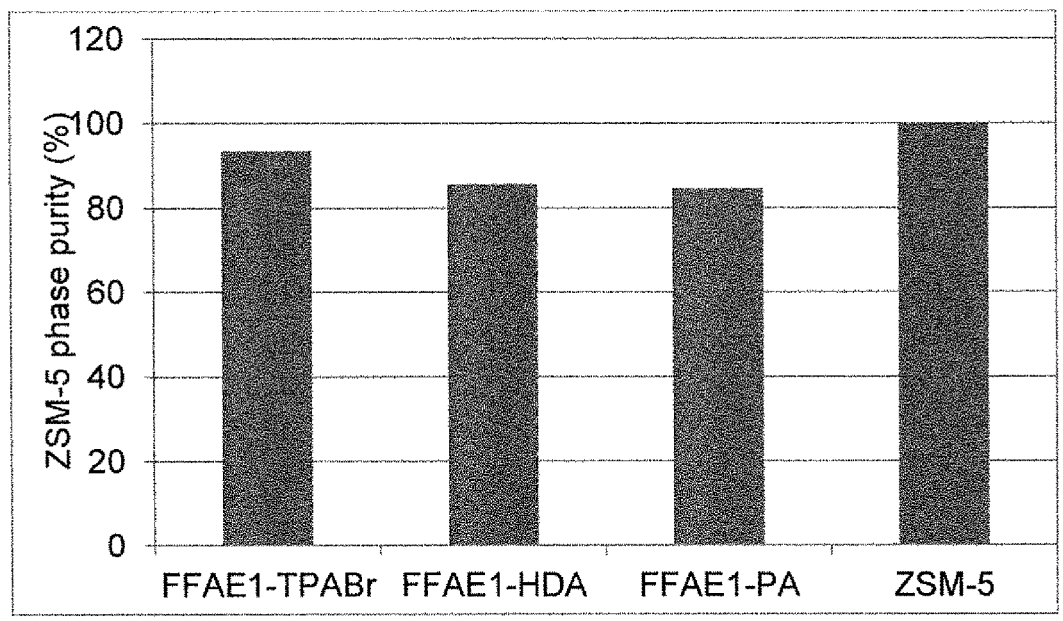
FIG. 11 shows a graphical comparison of ZSM-5 phase purity for various fly ash based preparations with different structure directing agents.

FIG. 11 shows a graphical presentation comparing the ZSM-5 phase purity of FFAE-OX1-TPABr, FFAE-OX1-HDA and FFAE-OX1-PA with a commercial reference zeolite ZSM-5 (ZSM-5). The ZSM-5 phase purity of FFAE-OX1-TPABr, FFAE-OX1-HDA and FFAE-OX1-PA was 94%, 86% and 85% respectively. The synthesis of high purity zeolite ZSM-5 from fused fly ash extracts using different structure directing agents provide options in the synthesis conditions, depending on several factors, for example, the type of material to be synthesised, the availability of the structure directing agents, and the prevailing cost of these materials.

Experiment 8.1: Influence of Si:Al Molar Ratio on the Aluminium Coordination in the Zeolite Framework The influence the Si:Al molar ratio on the aluminium coordination in fly ash-based zeolites ZSM-5 (FFAE-OX1-TPABr and FFAE-OX2-TPABr) was investigated by comparing the $^{27}Al$ solid state NMR spectra of FFAE-OX1 (B), FFAE-OX2 (C), FFAE-OX1-TPABr (E), and FFAE-OX2-TPABr (F) with that of a commercial ZSM-5 (D). $Al(NO_3)_3$ solution (0.1 M) was used as reference (A). The results are shown in FIG. 12.

Figure 12:
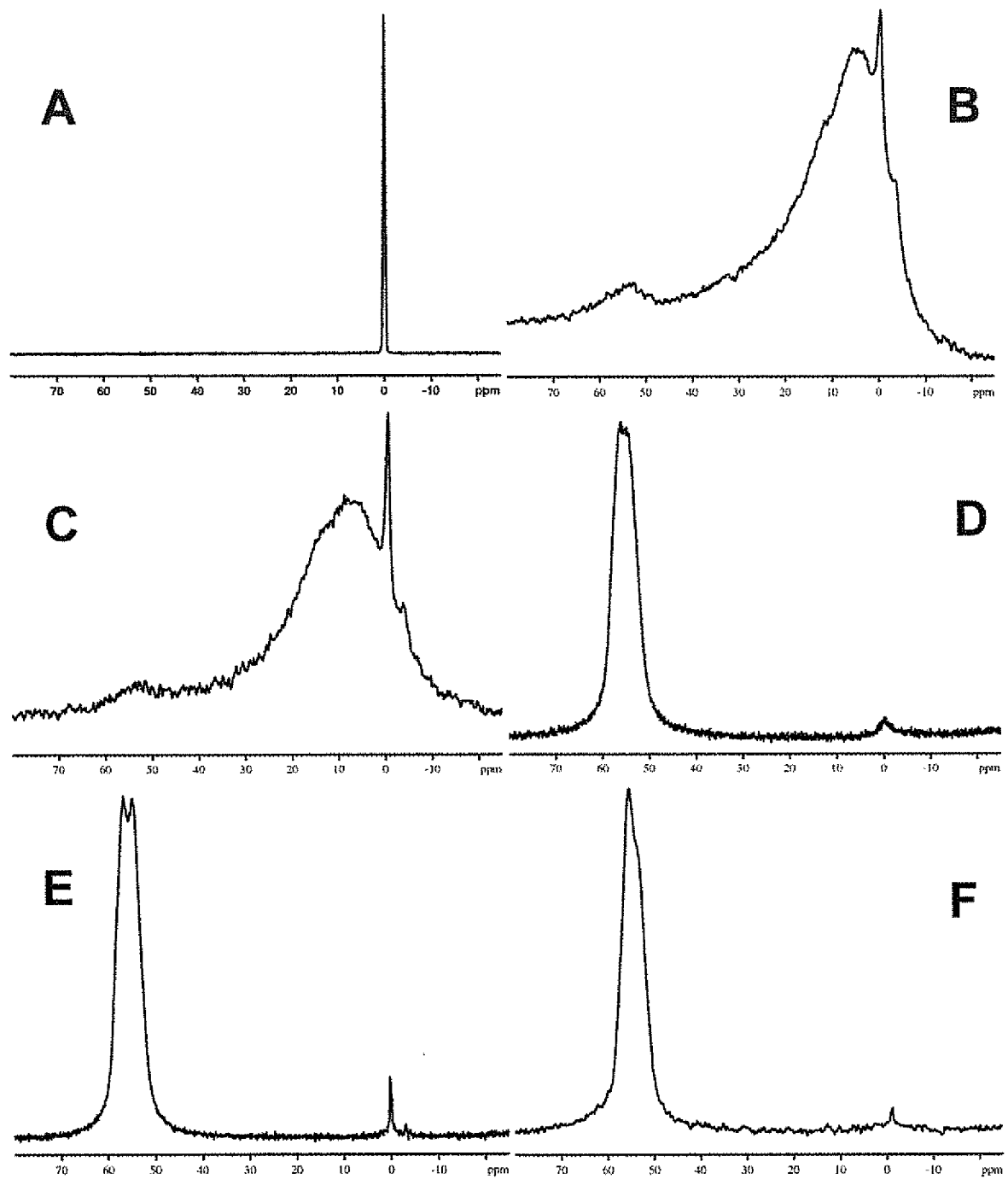
FIG. 12 shows $^{27}Al$ NMR spectra of a 0.1 M $Al(NO_3)_3$ reference, FFAE-OX1, FFAE-OX2, commercial ZSM-5, FFAE-OX1-TPABr and FFAE-OX2-TPABr.

From FIG. 12 it can be seen that an intense signal that was present in FFAE-OX1 and FFAE-OX2 around 0 ppm disappeared after synthesis of FFAE-OX1-TPABr and FFAE-OX2-TPABr, with an appearance of an intense signal at about 55 ppm. A commercial zeolite ZSM-5 and $Al(NO_3)_3$ were used as references to differentiate between the types of $^{27}Al$ NMR signals. It has been stated in the literature that a signal at about 0 ppm corresponds to extra-framework octahedrally coordinated Al, and an intense signal at about 55 ppm corresponds to framework tetrahedrally coordinated Al. It was calculated that FFAE-OX1-TPABr and FFAE-OX2-TPABr contains 98.6 and 97.8% of framework tetrahedrally coordinated Al.

Experiment 8.2: Influence of the Structure Directing Agent on the Aluminium Coordination in the Zeolite Framework The influence of the structure directing agent on aluminium coordination in the zeolite framework was investigated. The $^{27}Al$ solid state NMR spectra of FFAE-OX1 (B), FFAE-OX1-TPABr (D), FFAE-OX1-HAD (E), and FFAE-OX1-PA (F) were compared with those of a commercial zeolite ZSM-5 (C) and $Al(NO_3)_3$ (A).

Figure 13:
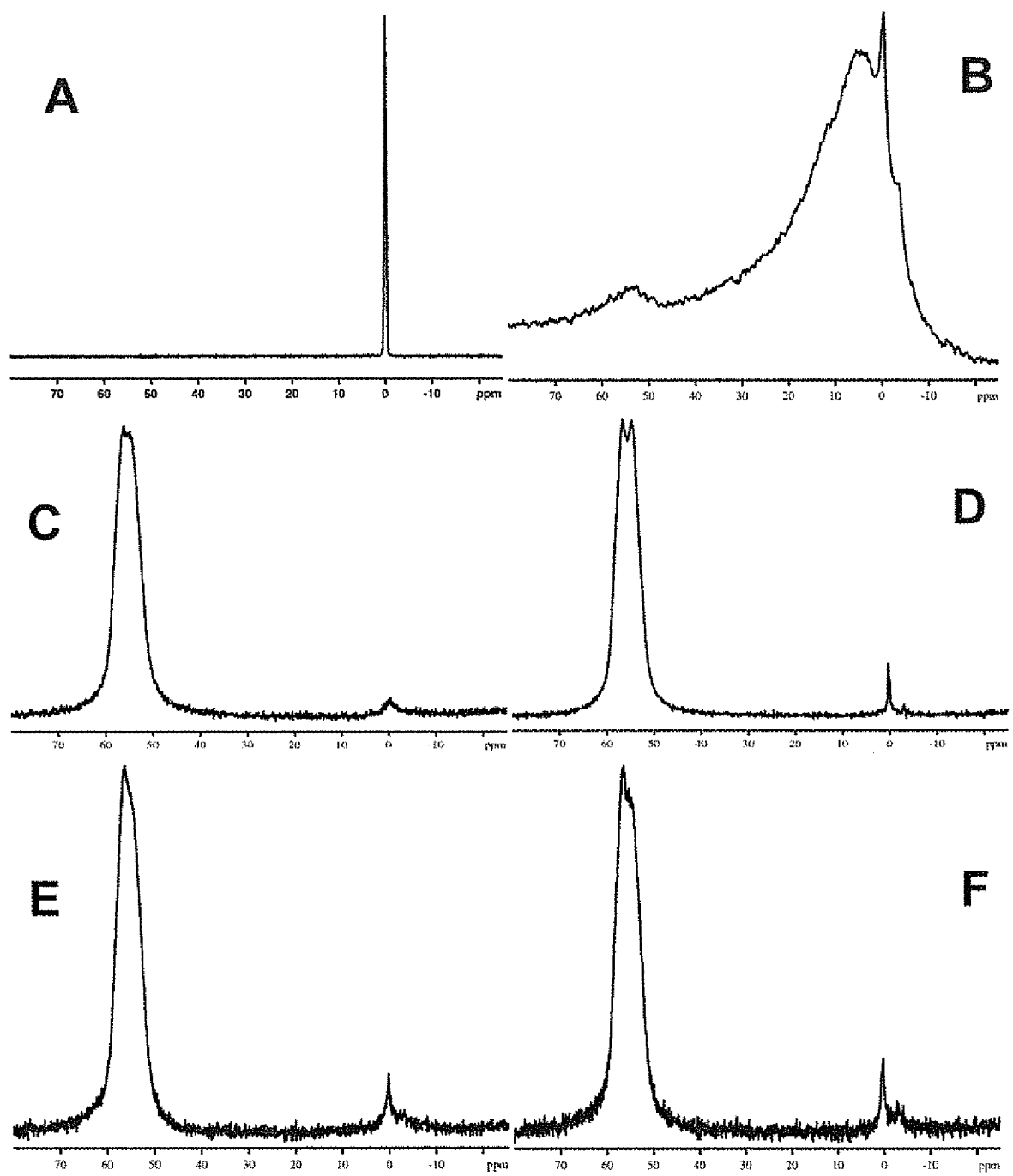
FIG. 13 shows $^{27}Al$ NMR spectra of a 0.1 M $Al(NO_3)_3$ reference, FFAE-OX1, commercial ZSM-5, FFAE-OX1-TPABr, FFAE-OX1-HDA and FFAE-OX1-PA.

From FIG. 13 it can be seen that that the signal of the extra-framework octahedrally coordinated Al at about 0 ppm in FFAE-OX1 was almost completely transformed into framework tetrahedrally coordinated Al at about 55 ppm in FFAE-OX1-TPABr, FFAE-OX1-HDA or FFAE-OX1-PA. The percentage of framework aluminium of FFAE-OX1-TPABr, FFAE-OX1-HDA and FFAE-OX1-PA was calculated 98.6, 96.5 and 95.8% respectively.

Experiment 9: Synthesis of Beta Zeolite from FFAE-OX1

The synthesis mixtures for the synthesis of beta zeolite was prepared by adding 2.85 g of FFAE-OX1 dissolved in 0.15 g of sodium hydroxide (NaOH), 6.35 g Tetraethlammonium hydroxide solution (40% TEAOH), and 3.65 g deionized water. The resulting reaction mixture was aged for 30 minutes at room temperature and then poured into a 100 mL Teflon lined stainless steel autoclave. The reaction vessel was treated hydrothermally at a set temperature of 140° C. for 72 hours.

After the synthesis of the beta zeolite, the reaction vessel was allowed to cool down. The recovered solid particles were repeatedly washed with deionized water and filtered. The recovered mass of the synthesized products was determined after drying the solid products overnight at 70° C. Thereafter, the products were detemplated first at a ramping rate of 2° C./min for 2 hours at 120° C. and then at 550° C. for 3 hours with a ramping rate of 3° C./min in air to remove organic template (TEAOH). Finally, the calcined products was washed after cooling down with deionised water and dried overnight at 70° C.

Figure 14:
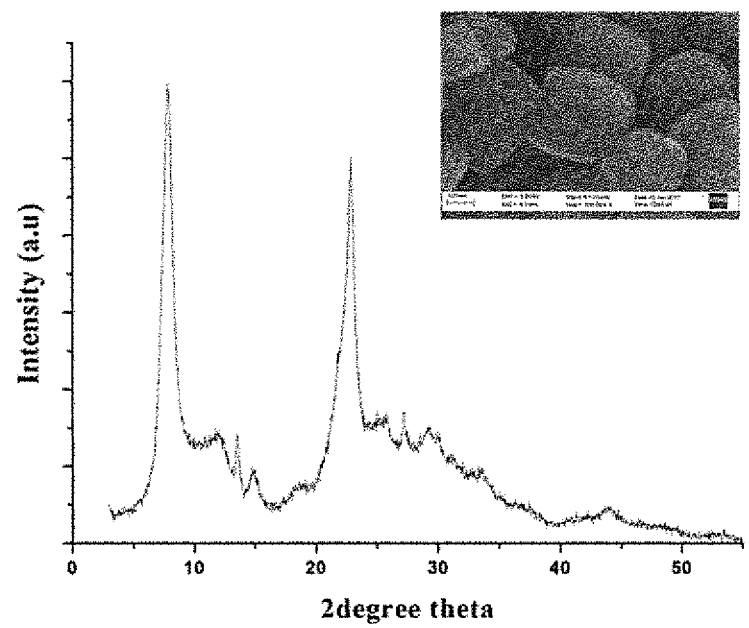
FIG. 14 shows a XRD pattern and a SEM image of the synthesized beta zeolite from FFAE-OX1.

FIG. 14 shows the powder XRD patterns of the synthesized beta zeolite. The diffraction pattern for the beta zeolite shows two main peaks at 7.7° and 22.7° 2θ, corresponding to a distinctive beta zeolite topology. This pattern confirms that a beta zeolite was formed with no other zeolitic phase impurity. The SEM analysis (FIG. 14 insert) of the morphological change of the formed products confirms the octahedral structure related to a typical beta zeolite.

Figure 15:
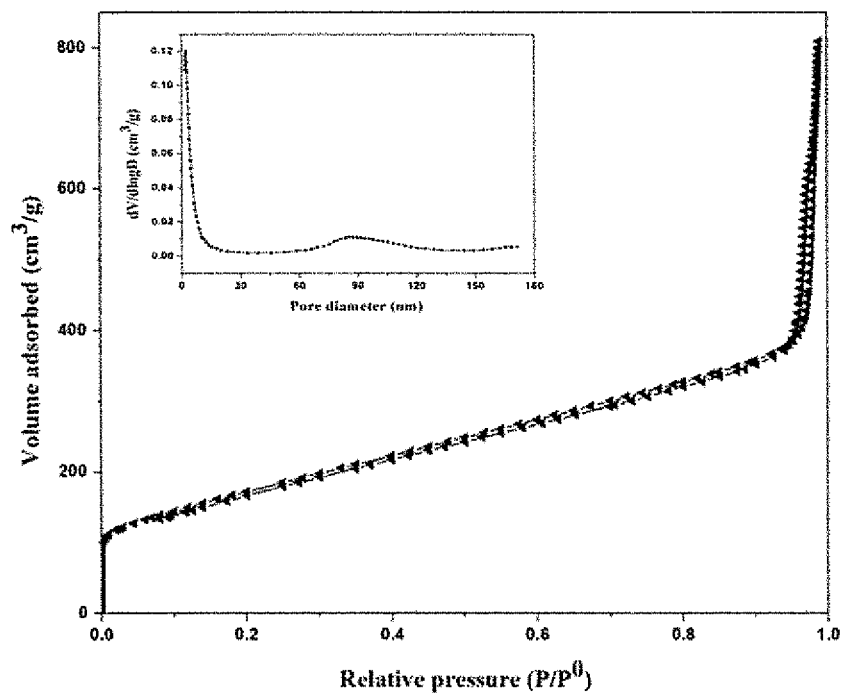
FIG. 15 shows $N_2$ adsorption/desorption isotherms of the synthesized beta zeolite from FFAE-OX1.

FIG. 15 shows the $N_2$ adsorption/desorption isotherms of the synthesized beta zeolite. The synthesized beta zeolite exhibited a hysteresis loop at high relative region (P/P0>0.95), which is a characteristic feature of a mesoporous material. This is a notable type IV isotherm with a pore size distribution curve in both the region of micropores and mesopores. The average pore size distribution is about 90 nm of the synthesized beta zeolite from FFAE-OX1.

Experiment 10: Synthesis of MCM-41 from FFAE-OX1

The mesoporous silica MCM-41 was synthesised using FFAE-OX1, cetyltrimethylammonium bromide (CTABr) (99%, Sigma Aldrich) and 25% aqueous solution of tetramethylammonium hydroxide pentahydrate (TMAOH) (Sigma Aldrich).

The TMAOH and CTABr were added to distilled water and stirred for a period of 20 minutes until a clear solution was formed. The fly ash based silica was then added to the solution and the mixture stirred for 2 hours at a temperature of 30° C. The mixture was then aged for 24 h at a temperature of 20° C. This step was followed by crystallisation for 48 hours in an oven at a temperature of 150° C. The crystallisation was achieved by placing the mixture in a Teflon-lined stainless-steel autoclave. The optimum mass ratio of the synthesis gel was $SiO_2$:0.30TMAOH: 1.65CTABr:12$H_2O$. The gel was aged for 20 hours at room temperature followed by crystallisation for a period of 48 hours at a temperature of 150° C. Upon crystallisation the product was vacuum filtered over nylon membrane filters papers (0.45 μm) and washed using distilled water. The resultant solid product was dried at 70° C. for 10 hours and calcined in air at a temperature of 550° C. for a period of 4 hours.

Figure 16:
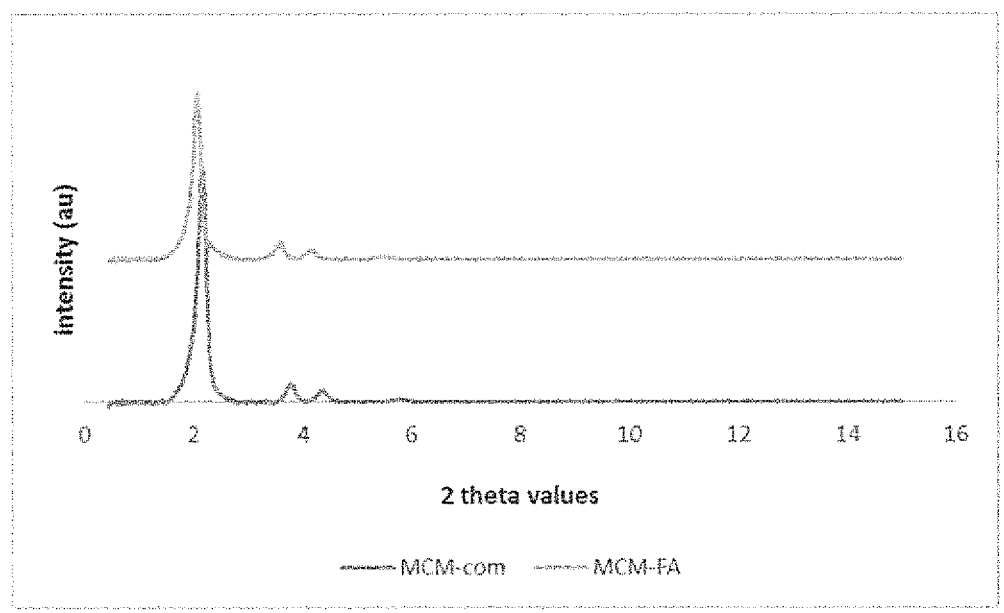
FIG. 16 shows a XRD pattern of commercial MCM-41 (MCM-com) and the fly ash based MCM-41 (MCM-FA)

The crystalline phase of the synthesised product was determined by XRD analysis to determine whether the synthesised product had the same crystallinity as the commercial MCM-41 counterpart. FIG. 16 shows that the XRD patterns of the commercial MCM-41 and that of the MCM-41 synthesised using FFAE-OX1 indicating that the characteristic peaks for MCM-41 were present in the synthesised material. The profile of the synthesised material closely resembled that of the commercial counterpart.

TABLE 4

BET surface area and the pore width of the MCM-41 supported metal catalyst

| Catalyst | pore width (A) | BET surface area ($m^2/g$) | micropore area ($m^2/g$) | external surface area ($m^2/g$) |
|---|---|---|---|---|
| MCM-41 (com) | 25.6 | 866 | 52 | 815 |
| MCM-41 (FA) | 42.7 | 867 | −0.9 | 911 |

The BET surface area of the fly ash based MCM-41 was found to be 867 $m^2/g$, whilst that of the commercial MCM-41 was 866 $m^2/g$. This shows that the synthesised product has comparable surface area as the commercial counterpart. However the synthesised product had more mesopores compared to the commercial one as could be deduced from the average pore width of the respective materials. The pore width of the commercial product was found to be 2.56 nm whilst that of the synthesised material was found to be 4.27 nm.

Figure 17:
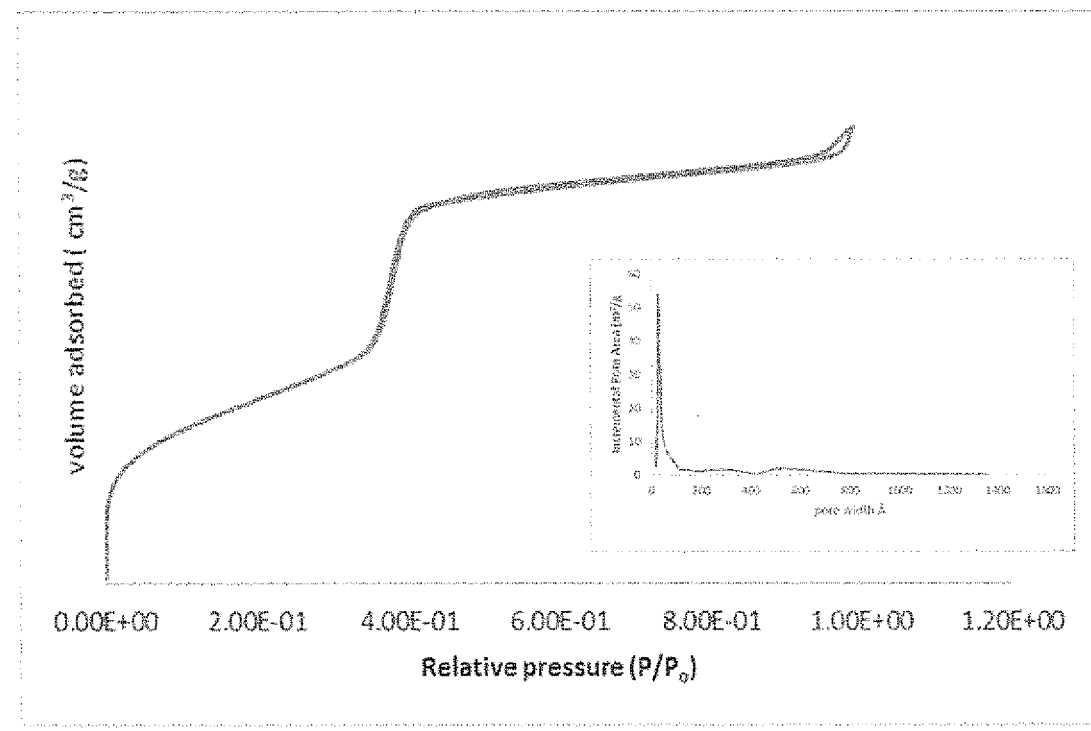
FIG. 17 shows $N_2$ adsorption/desorption isotherms at 77 K of the MCM-41 synthesised from fly ash based FFAE-OX1.

The nitrogen sorption isotherm for the MCM-41 synthesised from the fly ash based FFAE-OX1 is shown in FIG. 17. The hysteresis loops for the MCM-41 synthesised using silica extracted from coal fly ash shows that the inflection point was about 0.4 mmHg (P/$P_0$) values. The point at which the inflection occurs is characteristic of mesoporous materials and according to the IUPAC classification the isotherms are categorised as type A and D. The isotherm is characterised by three well defined regions, with the first region characterised by an initial increase in the nitrogen uptake at low relative pressure values. This may be ascribed to monolayer-multilayer adsorption on the pore walls. The second region at intermediate relative pressure values was characterised by a sharp gradient which may be ascribed to capillary condensation in the mesopores.

Experiment 11: Synthesis of Beta Zeolite from FFAE-C

The synthesis mixtures for the synthesis of beta zeolite was prepared by adding 2.85 g of FFAE-C dissolved in 0.15 g of sodium hydroxide (NaOH), 6.35 g Tetraethlammonium hydroxide solution (40% TEAOH), and 3.65 g deionized water. The resulting reaction mixture was aged for 30 minutes at room temperature and then poured into a 100 mL Teflon lined stainless steel autoclave. The reaction vessel was treated hydrothermally at a set temperature of 140° C. for 72 hours.

After the synthesis of the beta zeolite, the reaction vessel was allowed to cool down. The recovered solid particles were repeatedly washed with deionized water and filtered. The recovered mass of the synthesized products was determined after drying the solid products overnight at 70° C. Thereafter, the products were detemplated first at a ramping rate of 2° C./min for 2 hours at 120° C. and then at 550° C. for 3 hours with a ramping rate of 3° C./min in air to remove organic template (TEAOH). Finally, the calcined products was washed after cooling down with deionised water and dried overnight at 70 @C.

Figure 18:
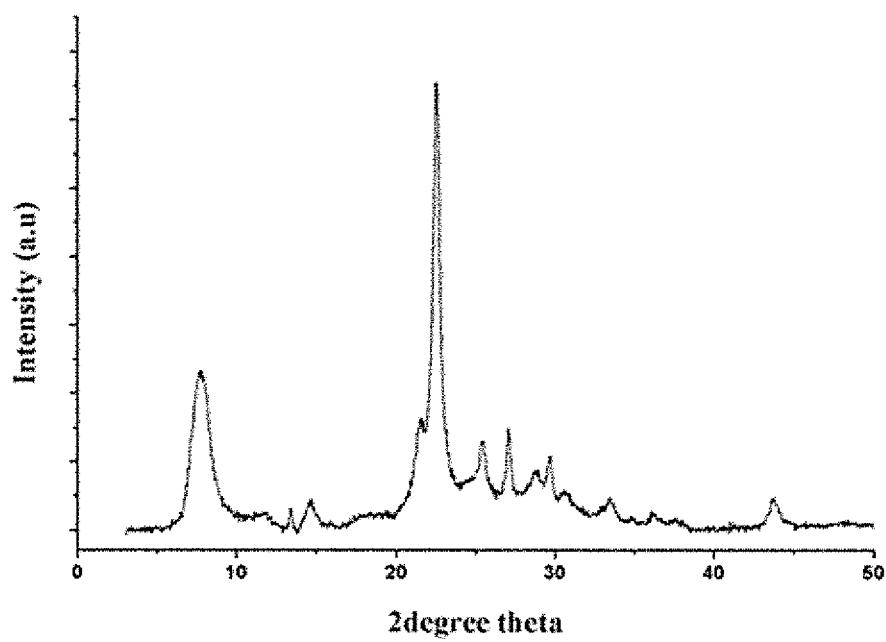
FIG. 18 shows a XRD diffraction pattern for beta zeolite synthesized from FFAE-C.

FIG. 18 shows a XRD diffraction pattern for the beta zeolite indicating two main peaks at 7.7 and 22.7° 2θ, corresponding to a distinctive beta zeolite. This pattern confirms that beta zeolite was formed with no other zeolitic phase impurity.

This above description of some of the illustrative embodiments of the invention is to indicate how the invention can be made and carried out. Those of ordinary skill in the art will know that various details may be modified thereby arriving at further embodiments, but that many of these embodiments will remain within the scope of the invention.

The invention claimed is:

1. A process for producing a high silica content zeolite from fly ash, the method comprising the steps of:
   a) fusing a fly ash containing starting material in the presence of a basic medium to form a fused reaction mixture, which mixture is brought into contact with a mineral acid, then separated to produce a first fly ash material;
   b) treating the first fly ash material with a selective chelating agent to produce an impurity depleted zeolite feedstock;
   c) treating the zeolite feedstock with a mineralizing agent;
   d) optionally further treating the zeolite feedstock with a structure directing agent to form an aluminosilicate containing gel; and
   e) crystallizing the aluminosilicate containing gel in a hydrothermal crystallization step to form the aluminosilicate zeolite.

2. A process according to claim 1, wherein the high silica content zeolite is a zeolite having a Si:Al molar ratio of greater than 10.

3. A process according to claim 1, wherein the high silica content zeolite is selected from the group consisting of pentasil-type zeolites, MCM-type zeolites, zeolite BEA, and SBA-15.

4. A process according to claim 3, wherein the high silica content zeolite is selected from the group consisting of ZSM-5, ZSM-8, and ZSM-11.

5. A process according to claim 4, wherein the high silica content zeolite is ZSM-5.

6. A process according to claim 3, wherein the high silica content zeolite is zeolite beta.

7. A process according to claim 3, wherein the high silica content zeolite is MCM-41 or MCM-48.

8. A process according to claim 1, wherein the selective chelating agent is selected from the group consisting of oxalic acid, Ethylenediaminetetraacetic acid (EDTA), diethylenetriaminepentaacetic acid (DTPA), N-(hydroxyethyl)-ethylenediaminetriacetic acid (HEDTA), nitrilotriacetic acid (NTA), citric acid, and ascorbic acid.

9. A process according to claim 8, wherein the selective chelating agent is oxalic acid or citric acid.

10. A process according to claim 1, wherein the structure directing agent is selected from the group consisting of tetrapropylammonium halide, tetraethylammonium halide, tripropylamine, dipropylamine, propylamine, 1,6-diaminohexane, 1,6-hexanediol, 1,5-diaminopentane, ethanolamine, propanolamine, pentaerythritol, methylquinuclidine, morpholine, ethylenediamine, diethylenetetraamine, triethylenetriamine, dipropylenetriamine, dihexamethylenetriamine, di-n-butylamine, ethanol, ethanol and ammonia, and glycerol.

11. A process according to claim 10, wherein the structure directing agent is selected from the group consisting of tetrapropylammonium bromide, 1,6-hexanediamine, and 1-propylamine.

12. A process according to claim 10, wherein the structure directing agent is 1,6-hexanediamine.

13. A process according to claim 1, wherein the basic medium is selected from the group consisting of sodium hydroxide, and potassium hydroxide.

14. A process according to claim 1, wherein the mineralizing agent is selected from the group consisting of a source of hydroxide ions, and fluoride ions.

15. A process according to claim 1, wherein the mineral acid is selected from the group consisting of sulfuric acid, phosphoric acid, hydrochloric acid, and nitric acid.

16. A process according to claim 15, wherein the mineral acid is sulfuric acid.

* * * * *